United States Patent [19]

Agache

[11] Patent Number: 4,522,173
[45] Date of Patent: Jun. 11, 1985

[54] INTERNAL COMBUSTION ENGINE USABLE WITH A HIGH VAPORIZATION HEAT FUEL

[75] Inventor: Georges Agache, Orléans, France
[73] Assignee: Chenesseau, Orleans, France
[21] Appl. No.: 544,120
[22] Filed: Oct. 20, 1983

[30] Foreign Application Priority Data

Oct. 22, 1982 [FR] France .............................. 82 17719

[51] Int. Cl.³ ............................................. F02F 3/26
[52] U.S. Cl. .................. 123/276; 123/193 P; 123/295; 123/263; 123/301; 123/305; 123/179 L
[58] Field of Search ............ 123/301, 276, 665, 193 P, 123/193 EP, 500, 501, 659, 661, 662, 179 L, 179 BG, 641, 263, 295, 305

[56] References Cited

U.S. PATENT DOCUMENTS

| | | | |
|---|---|---|---|
| 2,172,170 | 9/1939 | Megroot | 123/276 |
| 2,887,993 | 5/1959 | Shallenberg | 123/301 |
| 2,977,942 | 4/1961 | Reynolds | 123/301 |
| 3,195,519 | 7/1965 | Bishop et al. | 123/275 |
| 3,709,206 | 1/1973 | Myers | 123/641 |
| 3,908,624 | 9/1975 | Miyake et al. | 123/276 |
| 3,949,551 | 4/1976 | Eichler et al. | 123/179 L |
| 4,123,997 | 11/1978 | Oswald et al. | 123/305 |
| 4,204,489 | 5/1980 | Onishi | 123/179 L |
| 4,294,206 | 10/1981 | Urlaub et al. | 123/276 |

FOREIGN PATENT DOCUMENTS

| | | | |
|---|---|---|---|
| 815580 | 10/1951 | Fed. Rep. of Germany | 123/276 |
| 34122 | 10/1971 | Japan | 123/193 P |
| 75530 | 6/1980 | Japan | 123/276 |
| 177409 | 3/1922 | United Kingdom | 123/193 P |

Primary Examiner—Parshotam S. Lall
Attorney, Agent, or Firm—Larson & Taylor

[57] ABSTRACT

There is provided an alcohol internal combustion engine with direct injection and controlled ignition comprising a combustion chamber defined by a reciprocating piston and a flat cylinder head. The cylinder head supports a spark plug and an injector. In the dome of the piston is formed a cup disposed with respect to the intake valve so that the gases are set in rotation in the cup. The spark plug is placed in the cylinder head so that its electrodes are in the vicinity of the periphery of the cup where a rich mixture is produced by stratification at the end of compression. To further improve the stratification and the turbulence, favorable to complete and rapid combustion, a ramp may be provided around a fraction of the periphery of the cup.

10 Claims, 8 Drawing Figures

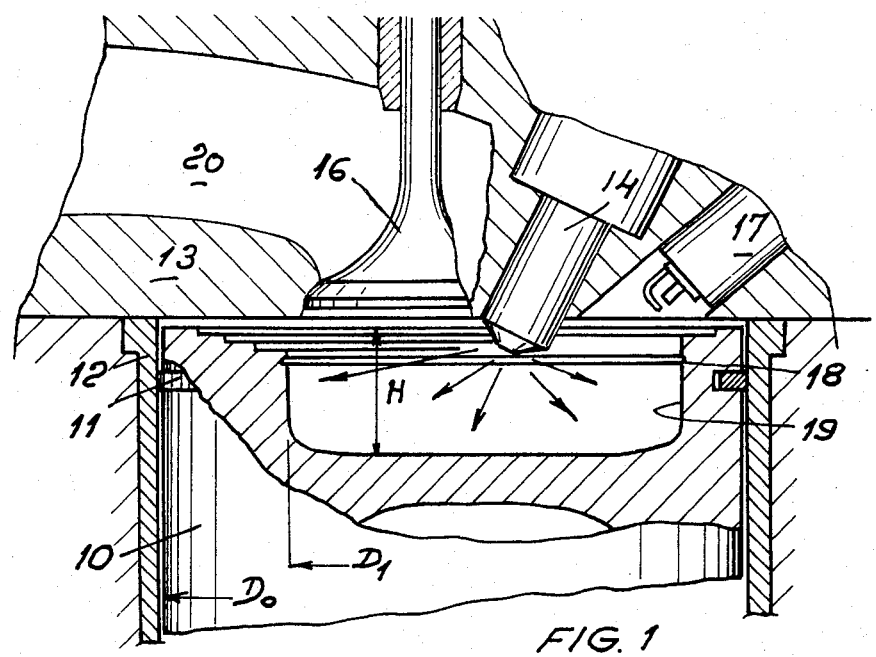
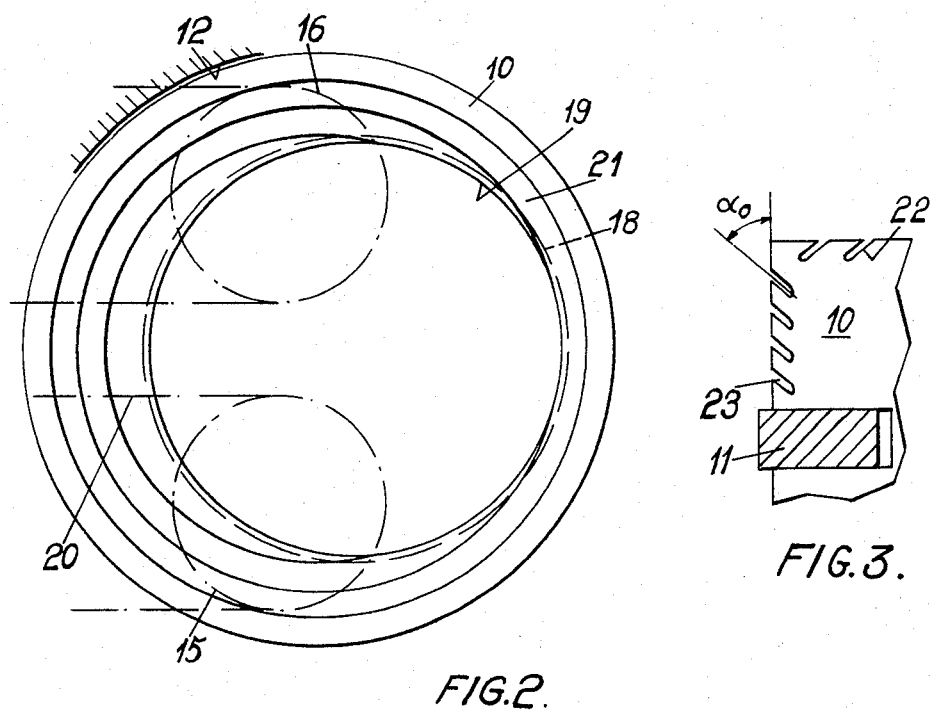

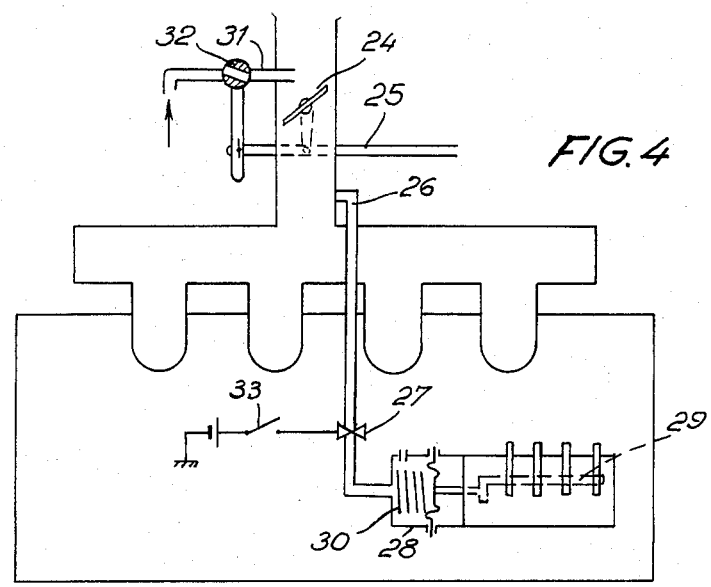
FIG. 4
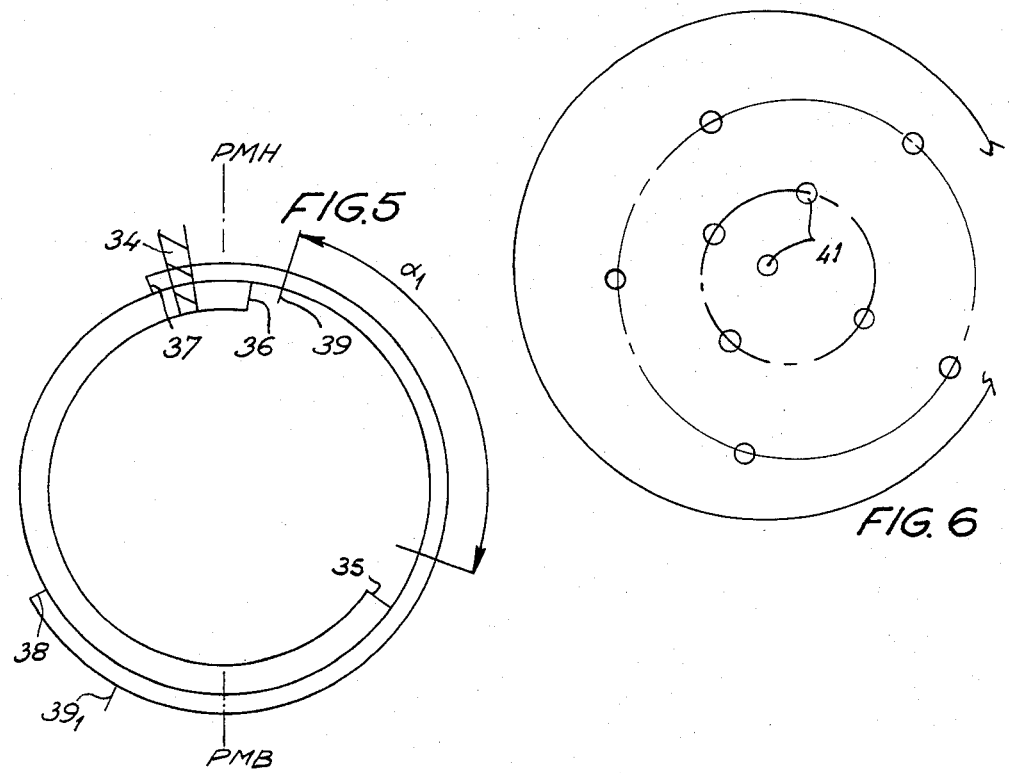
FIG. 5
FIG. 6

INTERNAL COMBUSTION ENGINE USABLE WITH A HIGH VAPORIZATION HEAT FUEL

BACKGROUND AND SUMMARY OF THE INVENTION

The present invention relates to an internal combustion engine intended for use with a fuel with a high vaporization heat either naturally (as alcohols, for example), or following hydration. It finds a particularly important application in the construction of engines, more especially industrial and agricultural engines, using fuels formed at least essentially by non petroleum products.

At the present time, practically all internal combustion engines use either the Beau de Rochas cycle with spark ignition or the self-ignition Diesel cycle (ignition by compression). None of these engines lends itself correctly to the use of the replacement fuels contemplated at the present time and, in the first place, alcohols. The use of alcohol as a fuel in an engine using the Beau de Rochas cycle results, even in the case of an engine with direct injection into the cylinders, in an insufficient efficiency and problematical operation particularly during cold start-up. The use of this same fuel in conventional Diesel engines, whose volumetric compression ratio varies particularly with the unit cubic capacity from 16 to 23 and in which the injection takes place at the end of compression, also leads to unsatisfactory results or to an impossibility because of the cetane deficiency.

FR Pat. No. 2 343 893 describes and claims an engine using a non petroleum fuel with fuel injection into the cylinder or each cylinder, having a volumetric compression ratio advantageously between 15 and 18, whose injection advance adjustment device is such that this injection advance is high, at least on startup. The use of a high advance, of at least 140°, possibly reaching a value of the order of 180° during cold starts and a substantially higher value under normal operation, allows vaporization to take place during the compression phase because of heating by intimate mixture with the air admitted into the cylinder. It is indispensible to note in passing that the cycle thus obtained is totally different from that of the Diesel engine. There occurs in fact a veritable carburation effect during the compression phase, with intimate mixing and complete vaporization of the fuel in the pressurized air and at a high temperature, during the non adiabatic compression, before ignition. On the other hand, in the case of the Diesel engine, direct injection takes place with immediate combustion of the fuel sprayed into the air at high temperature, with a very small advance.

It is an object of the invention to provide an engine in which the combustion of high vaporization heat fuel takes place under satisfactory conditions and with a high overall thermal efficiency, cold starts remaining easy and the engine being able to have a general construction like that of a conventional Diesel engine.

To this end, there is provided an engine whose combustion chamber or each combustion chamber is defined by a piston driven with a reciprocating movement in a cylinder and a cylinder head closing the cylinder and supporting injection means. Means are provided for creating in the chamber a high turbulence of the intake air which results in the vaporization of the fuel during the compression phase, a stratification of the caburetted mixture, ready ignition and rapid combustion. These means comprise a recess having a rotational symmetry cup substantially of revolution formed in the dome of the piston disposed, with respect to the air intake means and, possibly, to the burnt gas exhaust means, so that the gases are set in rotation in the cup. The cylinder head carries in addition a sparking plug placed in the vicinity of the periphery of the cup, i.e. confronting a zone of the chamber where stratification creates a "rich" mixture. The injector supported by the cylinder head has advantageously several rows of holes, typically about ten holes, so that the fuel jet which it supplies is very well distributed. This arrangement may be compared to that of a Diesel engine, whose injector generally supplies a jet in the form of a sheet. The cup formed in the dome of the piston will generally have an approximately cylindrical shape off-centered with respect to the piston. If we designate by $D_0$, $D_1$ and $H$ the diameter of the piston, that of the cup and the maximum depth of the cup, it will be generally advantageous to respect the following ranges:

$$0.60 \leq D_1/D_0 \leq 0.75$$

$$0.15 \leq H/D_0 \leq 0.20$$

Thus, the swirling flow of the air intake causes a turbulence which is concentrated, when the piston is nearing TDC (top dead center), in the cup where a partial stratification occurs. With the spark plug placed close to the zone of maximum richness, there is rapid combustion in a small diameter chamber which allows, in turn, a small advance, resulting in a reduction of the thermal losses and a high expansion ratio. The cup is advantageously completed by a ramp whose angular development may for example be of about 180°, sloping in the flow direction of the gases in the cup, terminating in a steep side situated in the vicinity of the spark plug, which retains the last liquid particles. However, such a ramp is difficult to machine: a modification which is simpler to machine consists in using a stepped piston.

The invention proposes moreover simple means which may be used to avoid the dilution effect when the fuel is likely to have damaging effects on lubrication and/or pollute the crank-case through the piston rings.

The invention will be better understood from reading the following description of the elements concerned by the invention of an engine forming one particular embodiment thereof, given by way of example.

SHORT DESCRIPTION OF THE DRAWINGS

FIG. 1 is a schematical sectional view of the top part of an engine cylinder in accordance with one particular embodiment of the invention;

FIG. 2 is a top view along line II—II of FIG. 1;

FIG. 3 is an enlarged detail view showing the construction of the top peripheral part of the piston;

FIG. 4 is a diagram showing one possible kinematic means for controlling the rack of the injection pump, from the throttle valve of the engine;

FIG. 5 is a distribution diagram;

FIG. 6 is a diagram showing the distribution of the holes of an injector usable in the embodiment of FIG. 1;

DETAILED DESCRIPTION OF AN EMBODIMENT

Figure 8:
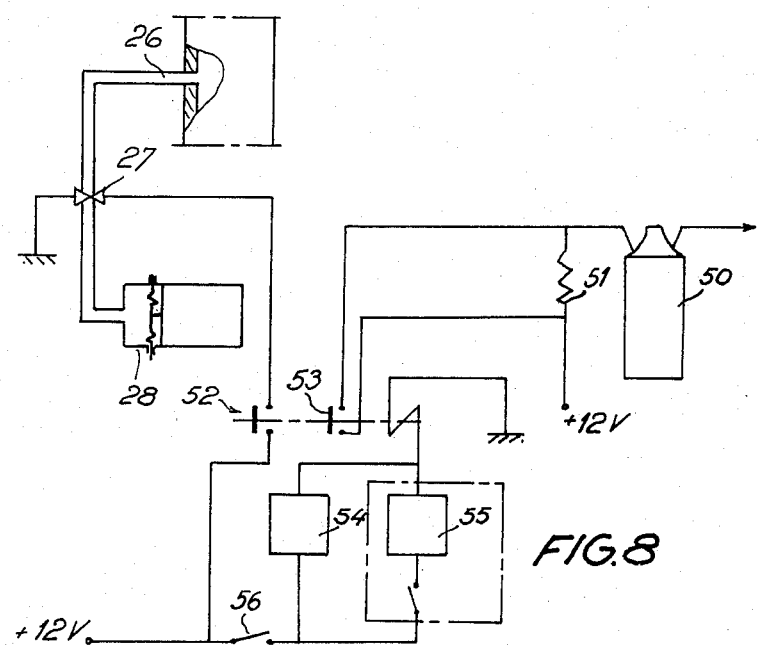
FIG. 8 is a simplified diagram of a device for starting and operating the engine from cold.

Referring to FIGS. 1 and 2, there is illustrated a high turbulence combustion chamber for an engine intended for use with alcohols as fuel or more generally fuels having a high vaporization heat, a low cetane index (which does not allow self ignition by compression) and a high octane rating.

The combustion chamber is limited, in a conventional way, by a piston 10 with piston rings 11 and driven with a reciprocating movement in a cylinder 12 and by a cylinder head 13 which supports an injector 14, at least one pair of valves 15, 16 and a spark plug 17.

In the dome of the piston is formed a cup 19 substantially of revolution. This cup 19 is off-centered and, in the embodiment illustrated, cylindrical with a substantially flat bottom. The ratio of the diameters of the cup and of the piston is between 0.60 and 0.75, at least for engines of average cubic capacity (about 0.7 to 1 liter). The ratio between the maximum depth of the cup and the diameter of the piston will usually be between 0.15 and 0.20. This cup forms the combustion chamber when the piston is in vicinity of TDC and when ignition occurs. It should be noted in passing that the ignition advance may be small, typically of 10° for slow running with an additional maximum advance range of the same order for agricultural or industrial engines whose speed is limited to about 3000 rpm. Combustion is rapid and it is therefore pointless using the high advances required in petrol engines for compensating the low propagation speed of the combustion in the case of using a poor mixture. In fact, the speed of combustion of alcohol in a poor mixture is not appreciably reduced as is the case with petrol. An essential advantage of this small advance is, obviously, that the heat losses are considerably reduced and an expansion ratio is obtained almost equal to the compression ratio.

The piston 10 which has just been described cooperates with a flat-shaped cylinder head, in which the spark plug 17 is placed so that the spark occurs approximately opposite the peripheral zone of cavity 19, where a rich mixture is produced by stratification, as will be seen further on.

The exhaust valve 15, and especially the intake valve 16, as well as the ducts which they close, are disposed and orientated so that the air admitted into the chamber assumes a rapid rotational movement which, at the end of compression, may reach several hundred revolutions per second in cup 19, which is small diameter with respect to the bore of the cylinder. This movement results in a high turbulence which is concentrated in the cup and by energetic stratification leading to a rich fuel mixture being obtained at right angles to the electrodes of sparking plug 17.

In the case illustrated in FIGS. 1 and 2, valves 15 and 16 have a lift parallel to the axis of the combustion chamber and they are each situated on one side of the diametrical plane occupied by injector 14 and plug 17. The intake valve 16 opens opposite a ramp 21 with a small slope (5° for example) surrounding cavity 19 over a fraction of its circumferential development. The outer edge of this ramp is advantageously parallel to the edge of the piston, so that ramp 21 has a variable width when cup 19 is off-centered, as shown in FIG. 2. This ramp further increases the richness of the mixture which occurs at right angles to the spark plug and increases the efficiency os stratification and turbulence. Its angular development depends naturally on the position of the valves. In the embodiment of FIGS. 1 and 2, ramp 21 is formed by several steps of constant depth machined in the head of the piston and having staggered centers; such an arrangement has the advantage of being easy to machine. Its action is completed by a semi-circular groove 18 of small depth (of the order of 1 mm).

The use as fuel of alcohol which, on the one hand, condenses on the dome of the piston, around cup 19 and on the walls of the cylinder when the engine is cold and, on the other hand, has no lubricating property, contrary to the heavy oils used in Diesel engines, may adversely affect operation. In fact, piston rings 11 cannot prevent the alcohol from passing into the crank-case and a dilution effect. To solve this problem, the piston is provided with circumferential sloping grooves. In the case shown in FIG. 3, the piston has a first set of grooves 22 on its upper face, about the cup, and a second set of grooves 23 on its lateral face, between the upper edge and the top ring 11. The purpose of grooves 22 is to collect the drops until vaporization and to prevent them from flowing towards the wall of the cylinder. Grooves 23, for their part, which may alone be provided, collect the alcohol which infiltrates between the piston and the bore and deposit this alcohol on the bore when the piston goes down so as to cause vaporization thereof. The slots must have an acute angle $\alpha_0$ with the surface in which they are cut out. This angle is advantageously of the order of 45°. It is sufficient for the slots to have a small width and depth typically of the order of 0.5 mm.

Because of the energetic stratification occurring in the combustion chamber, the engine is much less sensitive to the air control than conventional controlled ignition engines. It remains however necessary to throttle the air intake for starting up and it is preferable to do so during cold running under a light load. In practice, a throttle valve may be provided which will be closed for cold starting (an excess of richness not being disadvantageous in the case of an alcohol engine which may operate at greater than stoichiometric conditions up to richnesses going beyond approximately 1.35). The throttle valve may then be progressively opened, depending on the position of the rack of the injection pump, to about a third of the charge, then operate with fully open valve therebeyond. It should be noted in passing that it will be rarely advantageous to provide the engine of the invention with a high supercharging device which would cause cold starting difficulties to reappear because of the necessary lowering of the compression rate.

Another solution, illustrated in FIG. 4, comprises a pneumatic device for controlling the amount of fuel injected per cycle which is controlled as a function of the load, set by a throttle member actuated by an operator.

The throttle member shown is formed by a butterfly valve 24 having a control linkage 25. A pressure tapping 26 situated downstream of the butterfly valve is connected, through a cold start electromagnetic valve 27, whose role will be explained further on, to a pneumatic motor 28 whose mobile assembly, formed by a membrane, is subjected to the oppositely acting forces exerted by the depression and by a calibrated spring 30. This mobile assembly is secured to the rack 29 of the high pressure pump supplying the injectors and determines the position thereof. In FIG. 4, the electromagnetic valve is fed by a circuit comprising a switch 33 closed for cold starting.

Variations in the position of the butterfly valve 24 cause a variation of the absolute pressure of the air sucked in by the engine when this latter is operating. The range of variation of the absolute pressure extends between the atmospheric pressure (case of full load working) and a minimum value (corresponding to slow-running, if the case of operation as engine brake is set aside). The pneumatic motor 28 may be provided for ensuring a linear variation of the amount of fuel delivered per cycle between these two operating points, where the control depends on the usual criteria for internal combustion engines with spark ignition, i.e. to ensure the stoichiometry of the mixture.

With this arrangement, the necessary enrichment for cold starting may be provided. It is sufficient to cut off a line communicating the depression at pressure tapping 26 and motor 28 by energizing the electromagnetic valve 27. In this case, the atmospheric pressure is established in motor 28, which may be provided with a calibrated choke for venting to the atmosphere. The high pressure pump then operates at full delivery rate.

The diameter of the intake duct is chosen as a function of the desired filling rate for the combustion chambers of the engine and of the absolute pressure which prevails downstream of the butterfly valve 24 during full speed and maximum torque operation. A blow-by duct 31 advantageously provided with an oil-separator well opens upstream of the butterfly valve into the intake duct for recycling vaporized fuel which has passed from the combustion chambers into the crank-case. This gas removal is made all the easier since this fuel is given off as soon as the temperature of the engine rises, which considerably limits the effects of dilution. The blow-by duct 31 may be provided with a valve 32 linked to butterfly valve 24 so that the flow cross sectional areas offered by valve 32 and butterfly valve 24 are substantially proportional to each other.

It can be seen that the engine of the invention may be constructed by using most of the components of a conventional Diesel engine, so with small investments. It is sufficient to replace the piston so as to reduce the volumetric ratio typically to a value between 12 and 14 and to provide a location for a spark plug. The injector may have the same position as in the original Diesel engine, the position of cup 19 in the piston being determined accordingly, but instead of a single hole injector or an injector providing a flat sheet of fuel, an injector will be advantageously used having a large number of holes whose arrangement will depend on the distribution pattern, as will be seen further on.

The injection control device must be adjusted so that the injection advance is much higher than in a Diesel engine and so that the fuel is dispersed and has been vaporized and heated by the compression phase when the ignition spark is produced.

FIG. 5 shows at 34 a typical zone for varying the ignition advance in the engine. The inner circle shows at 35 and 36, respectively, the advance on opening and the delay on closing the exhaust. The outer circle shows, at 37 and 38, the advance on opening and the delay on closing the intake. It can be seen that valve overlapping has been kept which is conventional in Diesel engines with compression ignition. This overlap may however be reduced for the retention of burnt gases, is not troublesome in the case where the fuel has an alcohol basis and is even favorable to good cold starting.

According to one aspect of the invention, the injection takes place over a large angle $\alpha_1$ typically exceeding 60°, which allows a control cam to be used with a much smoother profile (i.e. a much smaller camming angle) than in conventional Diesel engines where the injection angle scarcely exceeds 40°. In practice an injection angle of about 60° will be used in the case of slow industrial engines, and an angle of about 90° for a rapid automobile engine.

When the engine is operating at its normal temperature, it will be desirable to begin injection immediately after the exhaust has been closed, as shown at 39 in FIG. 5. The increase in injection time increases correspondingly the time during which there is vaporization of the fuel, which results in a lower exhaust temperature, an increase in power and an increase in thermal efficiency. It should moreover be noted that the results in a modification of the cycle, where the compression is no longer adiabatic.

For injection to take place, at least in its initial phase, in the cup of the engine which will ultimately form a combustion chamber, with homogeneous distribution, it is desirable to adopt an injection with a large number of holes. In FIG. 6, the injector comprises ten holes such as 41 divided into three rows (center, 75° cone and 120° cone) and FIG. 1 shows that, at the beginning of injection, the fuel is projected entirely into cup 19.

Though the adoption of injection beginning shortly after the exhaust valve has closed is very favorable under normal running conditions, it is not acceptable for cold starts: because of the low rotational speed of the engine and because of the low temperature of the walls, the fuel does not remain in the form of a mist and is not vaporized but tends to settle.

Consequently, for starting the engine, a much smaller injection advance will be adopted not exceeding 180° with respect to the top dead center. There has been shown at $39_1$, in FIG. 5, an advance representative of those which may be used, the injection angle $\alpha_1$ remaining unchanged, which allows the same cam to be used.

Figure 7:
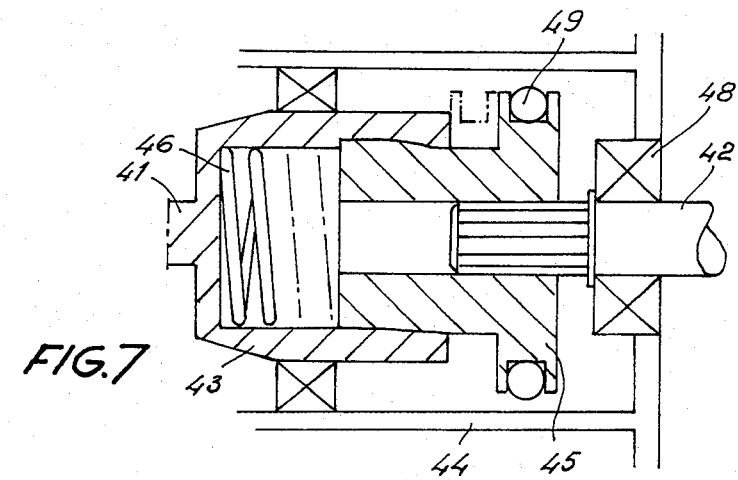
FIG. 7 is a schematical sectional view showing a rapid injection advance change device.

Modification of the injection advance may be obtained simply by interposing a rapid angle variation coupling, for example of the kind shown in FIG. 7, between the distribution shaft 41 driven by the engine and the shaft 42 of the high pressure injection pump. This coupling comprises a socket 43 integral with the shaft and mounted in a case 44 through a ball bearing and a sliding collar 45 slidingly keyed on the endmost part of the shaft 42. The sliding collar 45 and socket 43 are coupled by a helical connection imposing on the pinion a relative angular movement of about 100° with respect to the socket when this pinion goes from a rear position, towards which it is urged by a spring 46, to a forward position shown with a dash-dot line. the endmost positions are determined by the sides of a boss 47 of the sliding collar coming to bear on abutment walls provided on the socket and on a bearing 48 supporting shaft 42. The sliding collar 45 is provided with a fork 49 for bringing it into the forward position for startup.

With this arrangement, during starting of the engine and during the initial running period when cold, the injection advance may be reduced so that the fuel is again in the form of a mist when the spark is produced.

Since the volumetric ratio of an engine in accordance with the invention is substantially higher than that of a Beau Rochas cycle engine operating with petrol, the spark provided by a conventional coil ignition device may be insufficient for causing combustion during cold starting. This difficulty may be overcome by increasing the voltage at which the discharge takes place during starting of the engine and during an initial period of cold running, which may be set by timing means, for example at about 50 seconds.

FIG. 8 shows schematically a cold start circuit fulfilling this function. An attenuation resistor 51 is connected in series between the DC supply and the primary of the ignition coil 50 whose secondary supplies the contact breaker. A relay 52 short circuits resistor 51 during start up of the engine and during an initial phase of cold running. For that, the relay comprises a first mobile contact 53 which, when the winding of the relay is energized, short circuits resistor 51.

The circuit for supplying the coil of the relay comprises in series a thermostatic contact 54 and a time switch for a duration less than a minute, as well as the conventional ignition switch 56. A second pair of contact of the relay may be interposed in the supply for the electromagnetic valve 27, thus replacing the manual switch 33 of FIG. 4.

The operation is consequently as follows, during cold starting. Closure of the ignition contact 56 causes the contacts of relay 52 to close and so the pneumatic motor 28 is placed in communication with the atmosphere and resistor 51 is short-circuited. The control of the starter motor may be coupled to that of the sliding collar 45 so as to limit the injection advance to a value less than 180°. When the engine has started up and is ticking over, the injection advance takes on the normal value. At the end of a time delay set by circuit 55, when the engine is already warm, the electromagnetic valve 27 opens, reducing the amount of fuel injected per cycle to a value proportional to the degree of opening of the butterfly valve and the ignition takes place at normal voltage.

The temperature sensor 54 will be generally subjected to the temperature of the cooling water of the engine or to the temperature of the cylinder head block.

The circuit of FIG. 8 may obviously be completed so as to cause, instead of an all or nothing variation, a progressive variation and/or a modification of the time delay depending on the initial temperature of the engine, measured by sensor 54.

Instead of using a conventional coil ignition, an electronic type ignition may of course be used also, even a magneto of the kind used in gas engines or fishing boat engines.

It can be seen that the invention allows an engine to be obtained adapted for burning fuels of varying composition, having a non petroleum product basis without requiring external heat supply means and with a high overall thermal efficiency. The use of a small ignition advance in fact reduces the heat losses and allows the theoretical constant volume cycle to be approached and a normal exhaust temperature to be maintained, even at high PME. By adopting a fixed distribution and injecting setting, combined with magneto ignition which does away with the need for a battery of accumulators, it is possible to construct unsophisticated engines which may be used in countries lacking petroleum products but having on the other hand fuels available with an alcohol basis obtained by fermentation of products belonging to the biomass.

I claim:

1. An internal combustion engine with dirct injection and controlled ignition, for use with a high vaporization heat fuel, comprising at least a cylinder with air intake means and exhaust gas outlet means; a piston slidably received in said cylinder for reciprocating said cylinder and defining with said cylinder a combustion chamber; means for creating, in said combustion chamber, a swirling movement of the intake air, which comprise a recess formed in a surface of said piston limiting said chamber, substantially having a rotational symmetry and disposed with respect to said air intake means so that the gases are set in rotation in the recess, a spark plug carried by the cylinder wall in the vicinity of the periphery of said recess and means supported by the cylinder for injecting into the chamber a controlled amount of fuel with an adjustable injection advance of at least 140° during cold start and more than 180° on normal operation.

2. The engine according to claim 1, wherein the ratio between the diameter of the recess and that of the piston is between 0.60 and 0.75, whereas the ratio between the maximum depth of the recess and the diameter of the piston is between 0.15 and 0.20.

3. The engine according to claim 1, wherein the air intake means comprises a valve placed in the cylinder head and associated with a duct opening at a position with respect to the cup so that the intake air assumes a swirling movement in the cup.

4. An internal combustion engine with direct injection and controlled ignition, for use with a high vaporization heat fuel, comprising at least a cylinder with air intake valve means and exhaust gas outlet valve means; a piston slidably receiving in said cylinder for reciprocating in said cylinder and defining with said cylinder a combustion chamber; means for creating, in said combustion chamber, a swirling movement of the intake air, which comprise a recess formed in a surface of said piston limiting said chamber, substantially having a rotational symmetry about an axis parallel to the direction of reciprocation of said piston and disposed with respect to said air intake valve means so that the gases are set in rotation in the recess about said axis, a spark plug carried by the cylinder wall in the vicinity of the periphery of said recess and injection valve means supported by a head of said cylinder for injecting into the chamber a controlled amount of fuel with an injection advance of at least 140°, wherein the recess is surrounded, over a fraction of its periphery, by a ramp formed in the piston, sloping in the direction of the rotational flow of the air in the recess.

5. The engine according to claim 1, wherein the injection means comprises an injection valve formed with a plurality of ports formed to distribute fuel in the recess homogeneously when the piston is in the position corresponding to the beginning of injection under normal operating conditions of the engine.

6. The engine according to claim 1, wherein at least one of the upper and peripheral surfaces of said piston is provided, in the vicinity of the periphery of the piston, with a plurality of narrow coaxial grooves so directed as to collect and retain fuel drops.

7. The engine according to claim 2, further comprising control means for causing the injection means to deliver fuel throughout a range of advance angle between 60° and 90° and for causing injection to begin as soon as the exhaust means are closed, when the engine is at its normal operating temperature.

8. The engine according to claim 7, wherein said control means comprises a fast control coupling for modifying the advance by an angle of approximately 180°.

9. The engine according to claim 1, further comprising a throttle valve coupled to the injection means so as to choke the intake air flow during cold starting with low engine load.

10. The engine according to claim 1, further comprising means for increasing the amount of fuel injected per operating cycle and ignition voltage during start-up and cold running of the engine for a predetermined period of time after cranking.

* * * * *